Sept. 15, 1931.     T. A. McINTYRE     1,823,208
AUTOMOBILE ACTUATING MECHANISM
Filed March 21, 1930
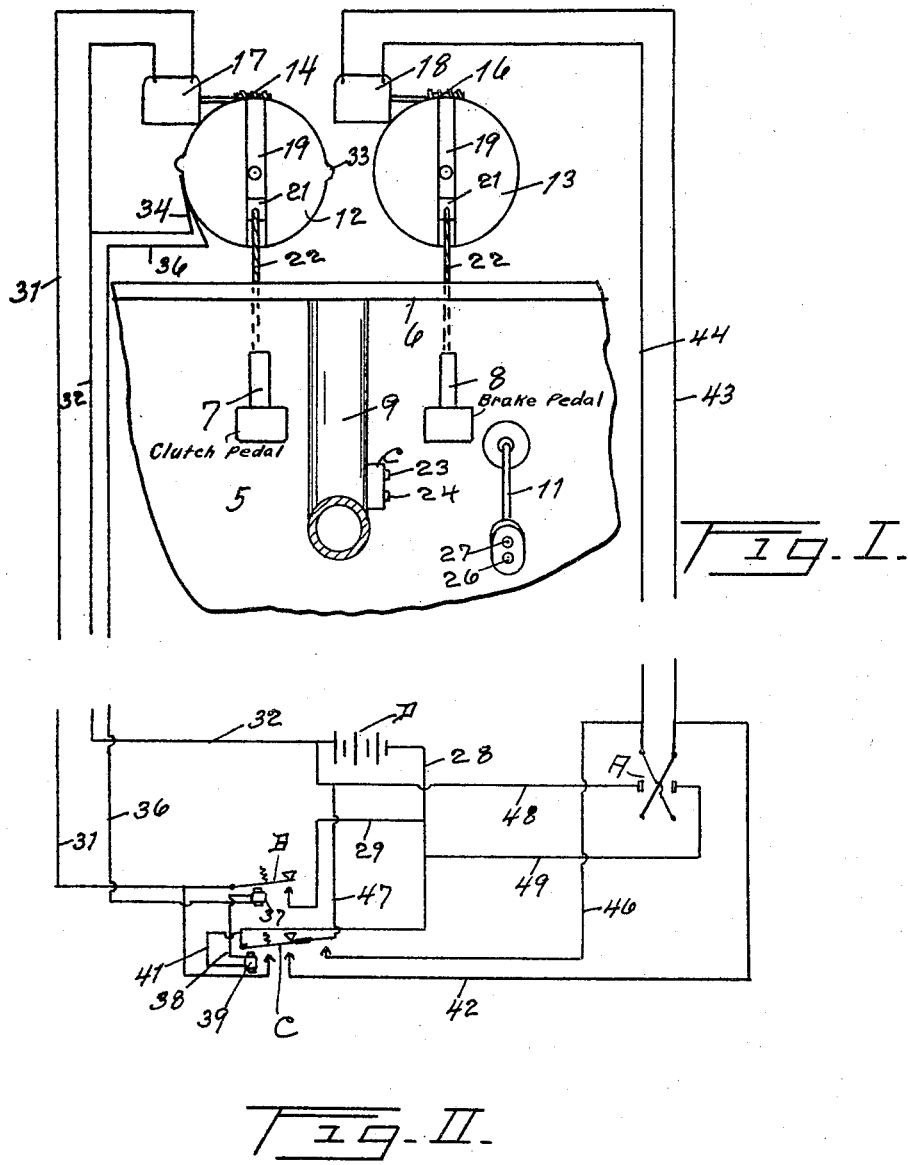
INVENTOR.
T. A. McINTYRE
BY
*Victor J. Evans*
ATTORNEY.

Patented Sept. 15, 1931

1,823,208

UNITED STATES PATENT OFFICE

THOMAS A. McINTYRE, OF SAN FRANCISCO, CALIFORNIA

AUTOMOBILE ACTUATING MECHANISM

Application filed March 21, 1930. Serial No. 437,950.

This invention relates to improvements in automobile actuating mechanism.

The principal object of this invention is to provide means whereby the clutch of an automobile may be disengaged and at the same time the brakes applied without the necessity of employing the feet.

Another object is to produce a device of this character wherein the motor vehicle may be quickly and efficiently controlled in traffic from a point upon the steering wheel.

Another object of the present invention is to provide a means which will accomplish the above objects without materially altering the construction of the standard form of motor vehicle, and without incurring an excessive cost.

A still further object is to produce a device of this character which will not detract from the appearance of the car upon which it is applied.

Other objects and advantages will be apparent during the course of the following description.

In the accompanying drawings forming a part of this specification, and in which like numerals are employed to designate like parts throughout the same.

Figure I is a diagrammatic view showing the mechanism as the same would be connected to the ordinary clutch and brake pedal, and Figure II is a diagrammatic wiring diagram for actuating the mechanism of Figure I.

In order to stop a vehicle in traffic it is necessary to depress the clutch pedal and also the brake pedal and to hold both depressed until it is again desired to start the car that is providing the gears are still in mesh. With my device it is possible to operate a push button upon the steering wheel or column and to have the clutch disengaged and the brake applied without requiring the use of the feet. It is possible with my device to actuate either the clutch or the brake together or each independently.

In the accompanying drawings wherein for the purpose of illustration is shown a preferred embodiment of my invention, the numeral 5 designates the floor board of a vehicle, the numeral 6 the dash and the numerals 7 and 8 the clutch and brake pedal respectively. At 9 I have shown a portion of the steering column and at 11 the customary gear shifting lever. These parts are all common to the ordinary vehicle and form no part of my invention. Mounted at a convenient point upon the vehicle is a clutch actuating disc 12 and a brake actuating disc 13. These discs are both pivoted so as to be rotated through the medium of worms 14 and 16 respectively which are driven by motors 17 and 18 respectively. Each disc has a slot 19 formed in the face thereof within which a block 21 may be adjustably positioned to or away from the center of the disc. Connected to each of the blocks is a cable 22 extending to the pedals 7 and 8. Mounted upon the steering column or upon the steering wheel is a clutch button 23 and a stop button 24. Mounted upon the gear shift lever 11 is a pair of brake actuating buttons 26 and 27. It is obvious that these buttons may be moved about to suit the convenience of the user for instance, some operators might prefer to have the stop button on the gear shift lever and the brake buttons upon the steering column. This however will not effect the operation of the device.

Referring now to Figure II it will be noted that the switch A is a reversing switch and is in reality the braking switch which is operated by the buttons 26 and 27. The switch B corresponds to the clutch button 23 and it will be here noted that a relay magnet is placed beneath the switch the purpose of which will be later seen. At C I have shown the switch which operates both the clutch and the brakes and corresponds to the button 24 which may be termed the stop switch or stop button.

The result of this construction is that when the device is positioned upon the vehicle and the car is proceeding the pedals will be in their normal position and the parts of my device will be as shown in Figure I. Assuming that it is desired to release the clutch for some purpose, the button B is pressed and current will pass from the battery D through the wire 28, wire 29, switch B, wire 31 to one side of the motor 17 thence through the motor back by the wire 32 to the battery D. This will cause the clutch disc 12 to start revolving and will pull upon the cable 22, thus moving the pedal 7 so as to actuate the clutch mechanism to disengage the same. As soon as the disc 12 has made a half-revolution the cam 33 will engage the contact 34 and break the circuit between it and the wire 36 which is connected to one side of the relay magnet 37 thence through the wire 38 and relay magnet 39 and by wire 41 and wire 28 to the opposite side of the battery. This breaking of the circuit will release the switch B and as the block 21 has been moved to the opposite side of the pivot of the disc, the clutch mechanism will be held in disengaged position.

When it is desired to again engage the clutch the same key B is pressed and the disc will make another half revolution and carry the block 21 to normal position thus returning the pedal and the clutch and causing the clutch to become engaged. When the stop button C is pressed the same circuits are completed as just described and an additional circuit is completed through the wire 42 and wire 43 to the motor 18 thence returning through the wire 44 and wire 46 to a third contact in the switch which engages an insulated portion of the switch which is connected by a wire 47 to the opposite side of the battery and as a result of the pressing of the switch C both the discs 12 and 13 will be given a half revolution in the manner before described.

When it is desired to actuate the brake only, either the button 26 and 27 are actuated as follows: Assuming that the button 26 rotates the motor 18 in such a direction as to apply the brake it will then be apparent that when the button 26 is pressed, current will flow from the battery D through the wire 48 to the wire 43 and return by wire 44 to the wire 49 and to the opposite side of the battery. Consequently by holding the button down the brakes will be applied and depending upon how long the button is held will depend upon whether the brakes are fully set or not. When the button 27 is pressed the action will be exactly the same with the exception that the current will flow to the motor in the opposite direction and consequently the disc will be reversed in the direction of rotation and the brakes will be released.

It will thus be seen that I have devised a mechanism whereby the driver may manipulate the machine entirely without the use of the feet other than to actuate the accelerator. At the same time the fact that the pedals 7 and 8 are only connected to the blocks 21 by flexible cables it still leaves the pedals in condition to be manually operated if the driver so desires.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In combination with a motor vehicle having a clutch pedal and a brake pedal, a disc mounted adjacent each of said pedals, a sliding block carried in the face of each of said discs, a cable connecting said blocks and said pedals, a motor for individually driving each of said discs, and remote means for actuating said motors.

2. In combination with a motor vehicle having a clutch pedal and a brake pedal, a disc mounted adjacent each of said pedals, a sliding block carried in the face of each of said discs, a cable connecting said blocks and said pedals, a motor for individually driving each of said discs, remote means for actuating said motors, said remote means comprising contact mechanism for selectively directing currents from the battery of said car to said motors independently or jointly.

In testimony whereof I affix my signature.

THOMAS A. McINTYRE.